(12) United States Patent
Park et al.

(10) Patent No.: US 12,415,741 B2
(45) Date of Patent: Sep. 16, 2025

(54) REFILL SYSTEM WITH IMPROVED UTILIZATION RATE OF ULTRA-THIN GLASS PRODUCTION PROCESS

(71) Applicants: Samsung Display Co., Ltd., Yongin-Si (KR); DOWOOINSYS Co., Ltd., Cheongju-si (KR)

(72) Inventors: Hanggyun Park, Suwon-si (KR); Hyo-Seop Kim, Asan-si (KR); Hyoungsuk Roh, Cheonan-si (KR); Jang Doo Lee, Hwaseong-si (KR); Bon Ki Koo, Chungcheongbuk-do (KR); Jeong Gi Kim, Yongin-si (KR); Seok Joo Yoon, Cheonan-si (KR); Hyungsup Lee, Yongin-si (KR); Kyoung Yong Cha, Yongin-si (KR)

(73) Assignees: SAMSUNG DISPLAY CO., LTD., Gyeonggi-Do (KR); DOWOOINSYS CO., LTD., Cheongju-si (KR)

( * ) Notice: Subject to any disclaimer, the term of this patent is extended or adjusted under 35 U.S.C. 154(b) by 867 days.

(21) Appl. No.: 17/557,650

(22) Filed: Dec. 21, 2021

(65) Prior Publication Data
US 2022/0234934 A1    Jul. 28, 2022

(30) Foreign Application Priority Data

Jan. 27, 2021   (KR) .................. 10-2021-0011846
Aug. 27, 2021   (KR) .................. 10-2021-0113612

(51) Int. Cl.
*C03B 27/03*      (2006.01)
*C03C 21/00*      (2006.01)
(Continued)

(52) U.S. Cl.
CPC ............ *C03B 27/03* (2013.01); *C03C 21/002* (2013.01); *F27B 3/28* (2013.01); *F27D 19/00* (2013.01);
(Continued)

(58) Field of Classification Search
CPC ......... C03B 27/03; C03C 21/002; F27B 3/28; F27D 19/00; F27D 21/0028; F27D 21/0035; F27D 2019/0075
See application file for complete search history.

(56) References Cited

U.S. PATENT DOCUMENTS 4,980,797 A * 12/1990 Blomgren, Jr. ......... H01T 19/00
                                                361/233
6,534,120 B1 * 3/2003 Ozawa ................ G11B 5/8404
                                                427/127

(Continued)

FOREIGN PATENT DOCUMENTS

CN    201544396 U  *  8/2010
CN    203999346 U     12/2014
(Continued)

OTHER PUBLICATIONS

CN_107082553_A English translation (Year: 2017).*
(Continued)

*Primary Examiner* — Steven S Anderson, II
*Assistant Examiner* — Kurt Wolford
(74) *Attorney, Agent, or Firm* — CANTOR COLBURN LLP

(57) ABSTRACT

A refill system includes a tempering furnace, a refill furnace which stores the molten potassium nitrate obtained by melting powdered potassium nitrate, a supply unit which supplies the molten potassium nitrate to the tempering furnace, a tempering furnace side load measuring unit which measures a load amount of the molten potassium nitrate in (Continued)

the tempering furnace, a refill furnace side load measuring unit which measures a load amount of the molten potassium nitrate in the refill furnace, and a central control unit which checks the load amount of the molten potassium nitrate in the tempering furnace and the refill furnace in real time, and controls the supply unit to stop supplying the molten potassium nitrate to the tempering furnace when the load amount of the molten potassium nitrate in the tempering furnace is greater than or equal to a predetermined load amount.

14 Claims, 11 Drawing Sheets

(51) Int. Cl.
  *F27B 3/28*    (2006.01)
  *F27D 19/00*   (2006.01)
  *F27D 21/00*   (2006.01)
(52) U.S. Cl.
  CPC .. *F27D 2019/0075* (2013.01); *F27D 21/0028* (2013.01); *F27D 21/0035* (2013.01)

(56) References Cited

U.S. PATENT DOCUMENTS

| | | | |
|---|---|---|---|
| 10,261,218 | B2 | 4/2019 | Ahn |
| 10,955,130 | B1 * | 3/2021 | McIntyre, II ............. F01K 7/44 |
| 2022/0234934 | A1 | 7/2022 | Park et al. |

FOREIGN PATENT DOCUMENTS

| | | | | |
|---|---|---|---|---|
| CN | 107082553 | A | * | 8/2017 |
| CN | 108706891 | A | | 10/2018 |
| CN | 209456515 | U | | 10/2019 |
| CN | 111056750 | A | | 4/2020 |
| CN | 217838746 | U | | 11/2022 |
| JP | 2003137606 | A | * | 5/2003 |
| JP | 4370430 | B2 | * | 11/2009 |
| JP | 2013100196 | A | * | 5/2013 |
| KR | 1020110034420 | A | | 4/2011 |
| KR | 101143303 | B1 | | 5/2012 |
| KR | 101333289 | B1 | | 11/2013 |
| KR | 101661278 | B1 | | 9/2016 |
| KR | 101684344 | B1 | | 12/2016 |
| KR | 1020180056355 | A | | 5/2018 |
| WO | WO-2015182331 | A1 | * | 12/2015 ............... B23K 3/04 |

OTHER PUBLICATIONS

CN_201544396_U English translation (Year: 2010).*
JP_2013100196_A English translation (Year: 2013).*
JP_4370430_B2 English translation (Year: 2009).*
Control_by_Web_ultrasonic_sensors_and_level_monitoring.pdf (Year: 2019).*
Omega_silicone_rubber_heating_tapes_with_adjustable_thermostat_control.pdf (Year: 2007).*
SPC_high_temperature_insulation.pdf (Year: 2020).*
Tameson_ ball_valve_circuit_functions.pdf (Year: 2021).*
WO-2015182331-A1 translation (Year: 2015).*
JP-2003137606-A translation (Year: 2003).*

* cited by examiner

REFILL SYSTEM WITH IMPROVED UTILIZATION RATE OF ULTRA-THIN GLASS PRODUCTION PROCESS

This application claims priority to Korean Patent Application No. 10-2021-0011846, filed on Jan. 27, 2021, and 10-2021-0113612, filed on Aug. 27, 2021, and all the benefits accruing therefrom under 35 U.S.C. § 119, the content of which in its entirety is herein incorporated by reference.

BACKGROUND

1. Field

The disclosure relates to a refill system with improved utilization rate of an ultra-thin glass ("UTG") production process. More particularly, the disclosure relates to a refill system with improved utilization rate of an UTG production process, which improves the utilization rate of the UTG production process by automatically refilling molten potassium nitrate in a tempering furnace.

2. Description of the Related Art

In general, methods to strengthen glass includes physical tempering and chemical tempering.

In the physical tempering, glass having a thickness of about 5 millimeters (mm) or greater is heated to a temperature of about 550° C. to about 700° C. and then cooled rapidly immediately, and thus, the internal strength of the glass is intensified. The physical tempering is used mainly for the manufacture of the tempered glass door and glass for automotive.

However, the physical tempering is not applicable to a thin film glass having a thickness of about 3 mm in which a temperature difference between a core portion and a surface layer is not sufficient, a glass having low thermal coefficient is not tempered through the physical tempering. In the case of glass having a complex shape, the temperature difference between the core portion and the surface layer at portions thereof is not uniform. As a result, the glass is likely deformed since the physical tempering is performed at a relatively high temperature around a softening temperature.

In the chemical tempering, a thin film glass is immersed in the molten potassium nitrate bath of a tempering furnace at a temperature of about 450° C. for three hours or more and sodium ions in the glass are replaced with potassium ions in the potassium nitrate, thereby hardening the glass. The chemical tempering is particularly suitable for glass having a thickness of about 2.0 mm or thinner.

According to a method of the chemical tempering, the glass to be strengthened is heated at a temperature equal to a transition temperature or lower, e.g., a temperature in a range of about 300° C. to about 450° C., the potassium nitrate is melted at a temperature of about 380° C. or higher, and the heated glass is immersed in the molten salt for a certain amount of time or more. The chemical tempering described above creates a compressive stress layer on a surface of the glass to harden the glass.

The chemical tempering is a way to strengthen glass by ion exchange, the chemical tempering is applicable to both the thin film glass and the glass having complex shape, there is no risk of deformation during the process, and the chemical tempering is more precise.

In addition, the chemical tempering may be more desirable than the thermal tempering in view of hardness, and thus, the chemically tempered glass is able to be cut after the tempering.

SUMMARY

In performing a chemical tempering method, it is desired to periodically refill the molten potassium nitrate or to change entire molten potassium nitrate in the tempering furnace due to the change in concentration and characteristics of the molten potassium nitrate in the tempering furnace during the tempering process.

In order to refill a certain amount of molten potassium nitrate to the tempering furnace, the glass tempering process may halt, potassium nitrate in powder form may be added into the tempering furnace, and the powdered potassium nitrate may be melted to obtain the molten potassium nitrate. Thus, the utilization rate of the tempering device may be lowered during the time for adding and melting of the potassium nitrate.

Further, in order to change the entire molten potassium nitrate in the tempering furnace, it is desired to discharge the molten potassium nitrate in the tempering furnace, the tempering furnace may be cooled and cleaned, the powdered potassium nitrate may be inserted to the tempering furnace after the cleaning process, and the powdered potassium nitrate may be melted by providing heat to the tempering furnace. Thus, the utilization rate of the tempering device and the productivity of the tempered glass decrease.

As the related art of the disclosure, "Chemical tempering furnace device for uniform tempered glass" of Korean Patent Application No. 10-2011-0119171 was filed by the same applicant of the disclosure and issued. The chemical tempering furnace device for uniform tempered glass is a chemical tempering furnace device that strengthens glass by changing ions. Normal glass including alkali aluminosilicate is immersed into the molten potassium nitrate, and the sodium ions in the glass are replaced with the potassium ions in the molten potassium nitrate. The chemical tempering furnace device for uniform tempered glass includes a tempering furnace in which the glass is immersed into the molten potassium nitrate to allow the sodium ions of the glass to be replaced with the potassium ions of the molten potassium nitrate to strengthen the glass, a pre-heat furnace that is formed on an upper portion of the tempering furnace, provides heat to the tempering furnace to strengthen the glass and slowly cools down the tempering furnace after tempering, a glass loading jig that efficiently loads the glass to be tempered and transfers the glass to the pre-heat furnace and the tempering furnace, and a controller that drives and controls the tempering furnace and the pre-heat furnace.

The disclosure provides embodiments of a refill system with improved utilization rate of an ultra-thin glass ("UTG") production process, which automatically refills a chemical solution depending on an amount of the chemical solution for a glass tempering process in the tempering furnace to decrease a filling time and a replacing time for the chemical solution in the tempering furnace and to increase a productivity of tempered glass.

The disclosure provides embodiments of a refill system with improved utilization rate of the UTG production process, which directly refills a liquid chemical solution instead of a chemical powder when refilling the chemical solution in the tempering furnace to decrease a downtime of the refill system for the tempering of the glass and defects on the glass due to contamination occurring when the chemical powder is injected into the tempering furnace.

An embodiment of the invention provide a refill system of an ultra-thin glass production process. In such an embodiment, the refill system includes a tempering furnace filled with a molten potassium nitrate to temper a glass, a refill furnace which receives a powdered potassium nitrate to melt the powdered potassium nitrate to the molten potassium nitrate and stores the molten potassium nitrate obtained by melting the powdered potassium nitrate, a supply unit which supplies the molten potassium nitrate in the refill furnace to the tempering furnace, a tempering furnace side load measuring unit which measures a load amount of the molten potassium nitrate in the tempering furnace, a refill furnace side load measuring unit which measures a load amount of the molten potassium nitrate in the refill furnace, and a central control unit which checks the load amount of the molten potassium nitrate in the tempering furnace and the load amount of the molten potassium nitrate in the refill furnace in real time using the tempering furnace side load measuring unit and the refill furnace side load measuring unit, controls the supply unit to supply the molten potassium nitrate in the refill furnace to the tempering furnace, and controls the supply unit to stop supplying the molten potassium nitrate to the tempering furnace when the load amount of the molten potassium nitrate in the tempering furnace is greater than or equal to a predetermined load amount.

According to embodiments described herein, the refill system with improved utilization rate of an UTG production process automatically refills the molten potassium nitrate melted in the refill furnace to the tempering furnace and automatically refills the molten potassium nitrate in the refill furnace to the tempering furnace when the load amount of the molten potassium nitrate in the tempering furnace is less than a set reference value.

In such embodiments, the refill system with improved utilization rate of the UTG production process automatically refills a chemical solution based on an amount of the chemical solution for the glass tempering process, which is filled in the tempering furnace, and thus, a filling time and a replacing time for the chemical solution in the tempering furnace decrease, thereby increasing a productivity of tempered glass.

In such embodiments, when refilling the chemical solution in the tempering furnace, a liquid chemical solution is directly refilled instead of a chemical powder. Thus, a downtime of the refill system for the tempering of the glass is reduced, and defects on the glass due to contamination occurring when the chemical powder is injected into the tempering furnace is reduced.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1:
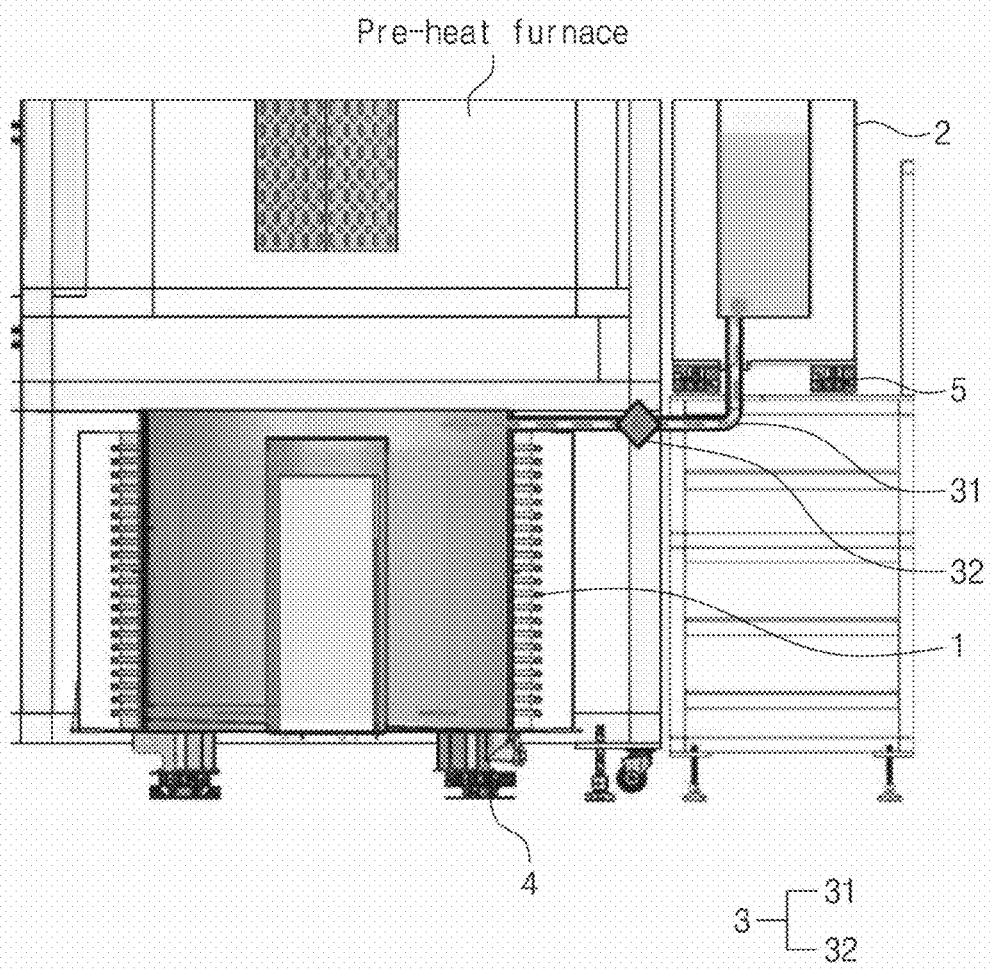
FIG. 1 is a conceptual view showing a refill system according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the disclosure, it will be understood that when an element or layer is referred to as being "on", "connected to" or "coupled to" another element or layer, it can be directly on, connected or coupled to the other element or layer or intervening elements or layers may be present. In contrast, when an element is referred to as being "directly on" another element, there are no intervening elements present.

Like numerals refer to like elements throughout. In the drawings, the thickness, ratio, and dimension of components are exaggerated for effective description of the technical content.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath", "below", "lower", "above", "upper" and the like, may be used herein for ease of description to describe one element or feature's relationship to another element(s) or feature(s) as shown in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 2A:
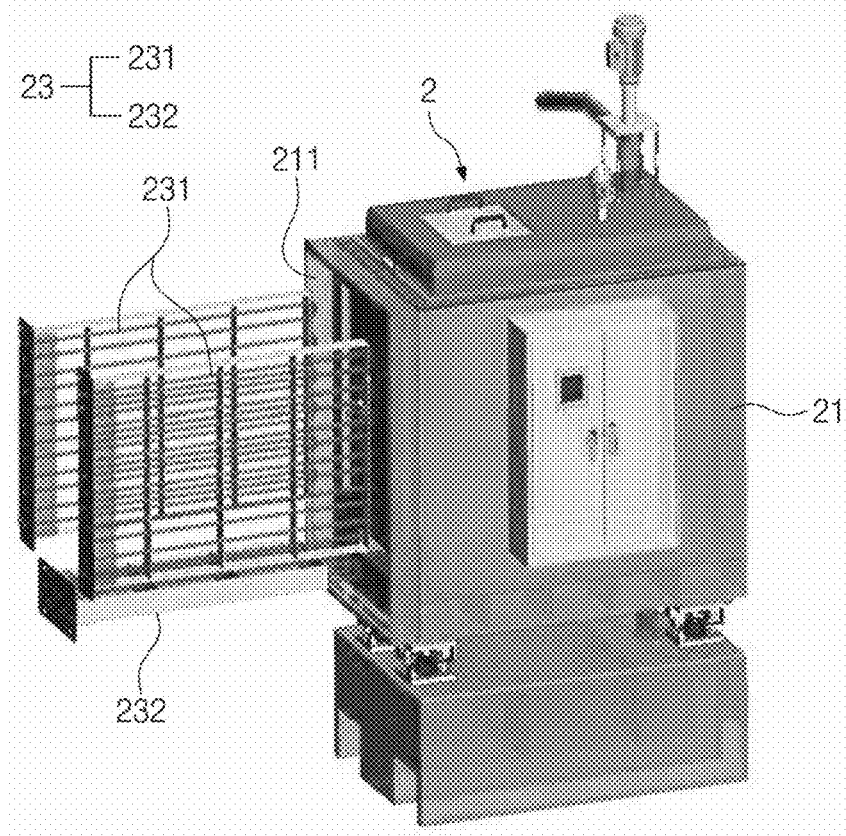
FIGS. 2A and 2B are perspective views showing a structure of a refill furnace according to an embodiment of the disclosure.
Figure 2B:
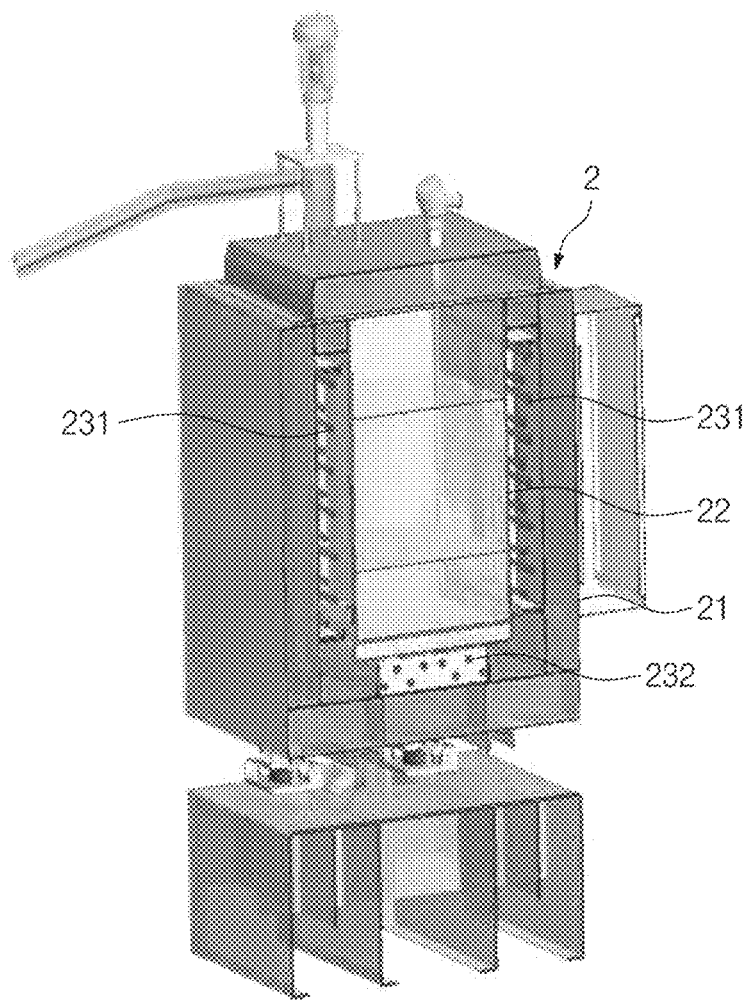
Figure 3:
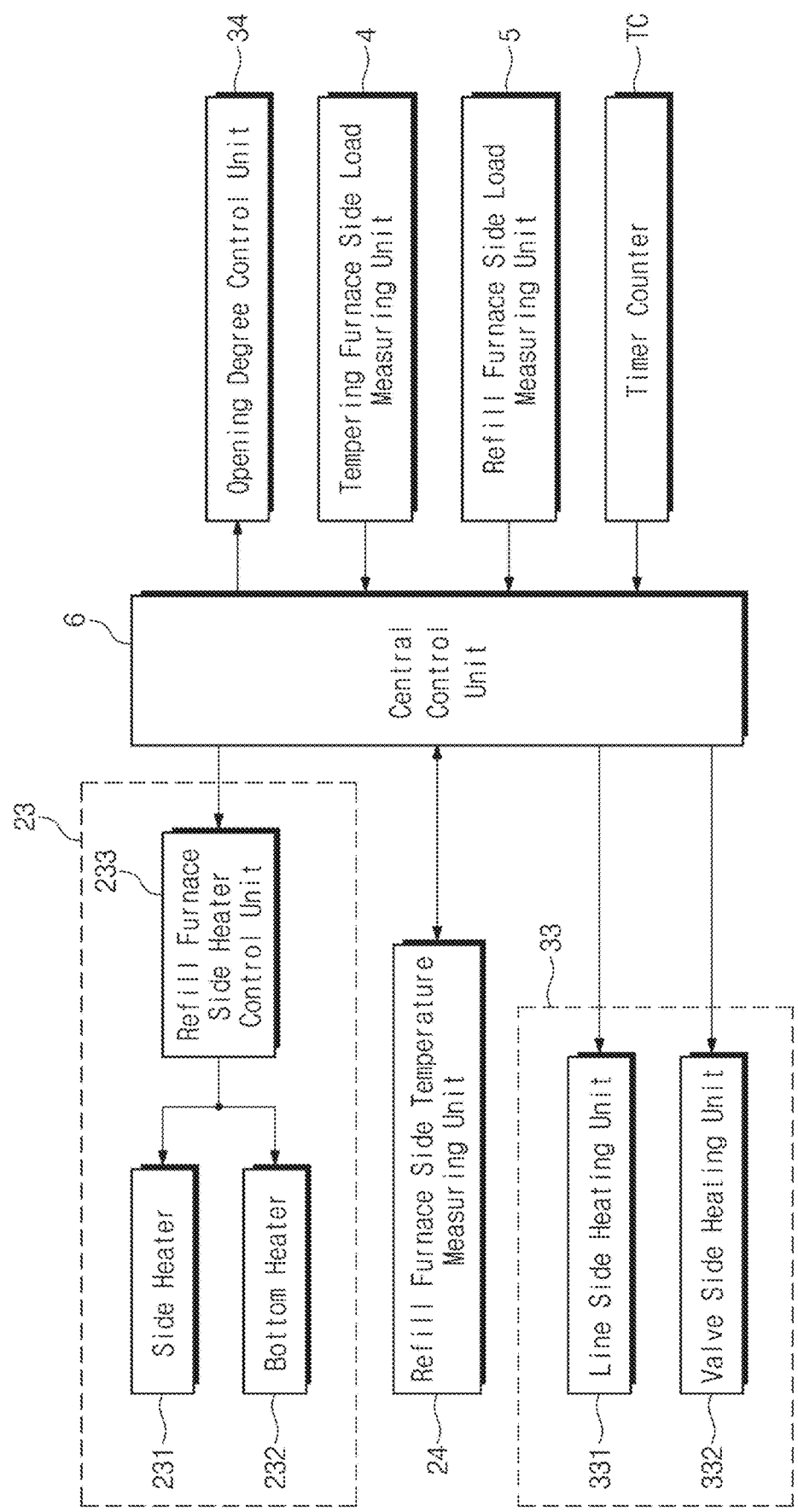
FIG. 3 is a block diagram showing a control operation of a central control unit according to an embodiment of the disclosure.

FIG. 1 is a conceptual view showing a refill system according to an embodiment of the disclosure, FIGS. 2A and 2B are perspective views showing a structure of a refill furnace according to an embodiment of the disclosure, and FIG. 3 is a block diagram showing a control operation of a central control unit according to an embodiment of the disclosure.

As shown in FIGS. 1 to 3, an embodiment of a refill system with improved utilization rate of a ultra-thin glass ("UTG") production process according to the disclosure may include a tempering furnace 1 filled with molten potassium nitrate to temper a glass, a refill furnace 2 that receives powdered potassium nitrate to melt the powdered potassium nitrate to a liquid state and stores the molten potassium nitrate, a supply unit 3 that supplies the molten potassium nitrate, which is filled in the refill furnace 2, to the tempering furnace 1, a tempering furnace side load measuring unit 4 that measures a load amount of the molten potassium nitrate, which is filled in the tempering furnace 1, a refill furnace side load measuring unit 5 that measures a load amount of the molten potassium nitrate, which is filled in the refill furnace 2, and a central control unit 6 that checks the load amount of the molten potassium nitrate, which is filled in the tempering furnace 1 and in the refill furnace 2, in real time using the tempering furnace side load measuring unit 4 and the refill furnace side load measuring unit 5, controls the supply unit 3 to supply the molten potassium nitrate, which is filled in the refill furnace 2, to the tempering furnace 1, and controls the supply unit 3 to stop supplying the potassium nitrate when the tempering furnace 1 is filled with the molten potassium nitrate over a predetermined load amount, that is, when the load amount of the molten potassium nitrate in the tempering furnace is greater than or equal to the predetermined load amount.

In an embodiment, as shown in FIGS. 2A, 2B, and 3, the refill furnace 2 may include an outer case 21, a potassium nitrate storage tank 22 that is installed in the outer case 21 and stores the powdered potassium nitrate or the molten potassium nitrate, a potassium nitrate melting unit 23 that is disposed between the outer case 21 and the potassium nitrate storage tank 22 and heats the potassium nitrate storage tank 22 to change phase from the powdered potassium nitrate filled in the potassium nitrate storage tank 22 to the molten potassium nitrate, and a refill furnace side temperature measuring unit 24 that measures a temperature of the molten potassium nitrate filled in the potassium nitrate storage tank 22 in real time.

In an embodiment, as shown in FIGS. 2A, 2B, and 3, the potassium nitrate melting unit 23 may include a side heater 231 installed in the outer case 21 and disposed between an inner sidewall of the outer case 21 and an outer sidewall of the potassium nitrate storage tank 22 to heat a side portion of the potassium nitrate storage tank 22, a bottom heater 232 installed in the outer case 21 and disposed between an inner bottom of the outer case 21 and an outer bottom of the potassium nitrate storage tank 22 to heat a lower portion of the potassium nitrate storage tank 22, and a refill furnace side heater control unit 233 that controls the side heater 231 and the bottom heater 232 to allow the temperature of the molten potassium nitrate, which is measured by the refill furnace side temperature measuring unit 24, to be within a set temperature range.

As shown in FIG. 2A, a potassium nitrate melting unit entrance 211 may be defined through one side surface of the outer case 21 to move the potassium nitrate melting unit 23 into and out of the outer case 21.

In an embodiment, the refill furnace 2 may further include a transfer unit that withdraws the potassium nitrate melting unit 23 out of the outer case 21 through the potassium nitrate melting unit entrance 211 by sliding the potassium nitrate melting unit 23 or inserts the potassium nitrate melting unit 23 from outside the outer case 21 into the outer case 21 by sliding the potassium nitrate melting unit 23.

In an embodiment, the transfer unit may include a rail structure or an linear motion ("LM") guide.

In such an embodiment, where the transfer unit may allow the potassium nitrate melting unit 23 installed in the outer case 21 to slide in and out of the outer case 21, the potassium nitrate melting unit 23 may be efficiently repaired and cleaned after installation.

Figure 4:
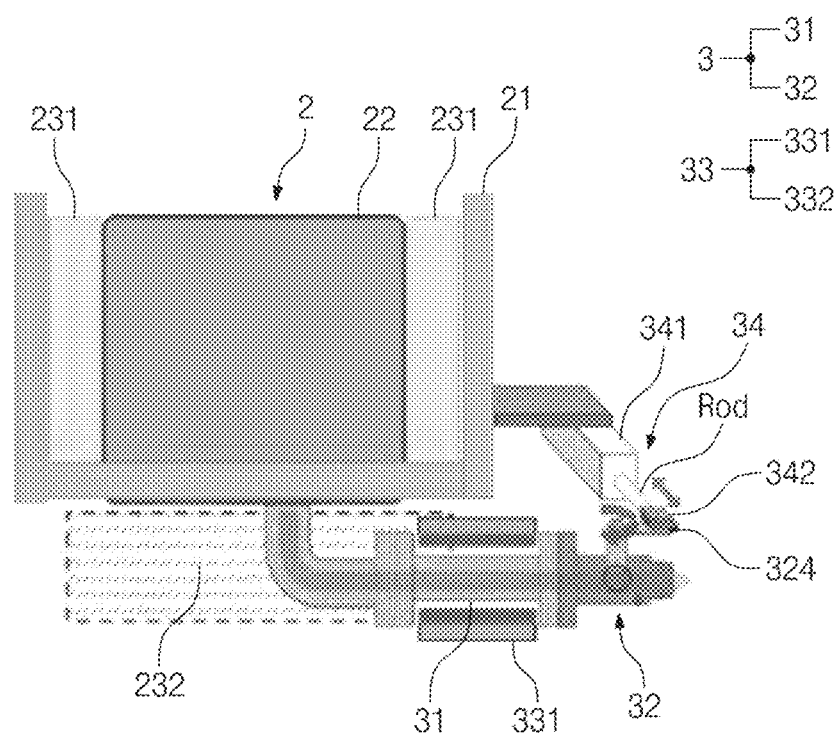
FIG. 4 is a view showing a refill furnace and a supply unit according to an embodiment of the disclosure.

As shown in FIG. 4, the supply unit 3 may include a molten potassium nitrate supply line 31 that supplies the molten potassium nitrate filled in the refill furnace 2 to the tempering furnace 1, a supply line shut-off valve 32 that is installed at the molten potassium nitrate supply line 31, controls (e.g., opens or closes) the molten potassium nitrate supply line 31 to stop or to continue the flow of the molten potassium nitrate to the tempering furnace 1, and adjusts a valve opening degree to control a flow rate of the molten potassium nitrate supplied to the tempering furnace 1 from the refill furnace 2, a first supply unit side heating unit 33 that heats the molten potassium nitrate supply line 31 and the supply line shut-off valve 32 such that the molten potassium nitrate passing through the molten potassium nitrate supply line 31 and the supply line shut-off valve 32 may not be hardened, and an opening degree control unit 34 that controls, e.g., opens and closes, the supply line shut-off valve 32 or adjusts the opening degree of the supply line shut-off valve 32 in response to a control signal from the central control unit 6.

The refill furnace 2 may be installed at a position higher than a position where the tempering furnace 1 is installed to allow the molten potassium nitrate filled in the refill furnace 2 to be introduced into the tempering furnace 1 through the supply unit 3.

Figure 5:
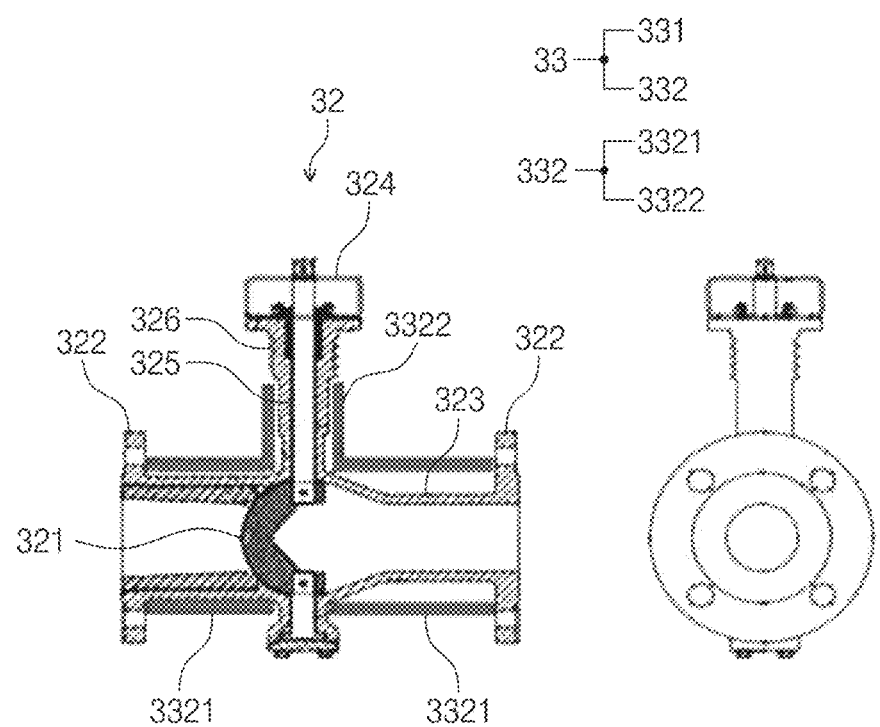
FIG. 5 is a view showing a supply line shut-off value according to an embodiment of the disclosure.

In an embodiment, as shown in FIG. 5, the supply line shut-off valve 32 may include a ball valve that adjusts the opening degree of the supply line shut-off valve 32 in accordance with a rotation direction and a rotation degree of a handle 324.

As shown in FIG. 4, the opening degree control unit 34 may include a linear actuator 341 that linearly moves a moving rod Rod in response to the control signal from the central control unit 6 and a valve handle rotation unit 342 that rotates the handle 324 mounted on the supply line shut-off valve 32 in conjunction with the moving rod Rod when the moving rod Rod moves linearly.

The linear actuator 341 may include or employ an electric actuator using or including a piston or a motor.

As shown in FIG. 5, the supply line shut-off valve 32 may include a body 323 connected to the molten potassium nitrate supply line 31 to pass the molten potassium nitrate therethrough, a ball 321 installed in the body 323 to adjust the flow rate of the molten potassium nitrate, and a connector 322 for pipe connection on left and right ends of the body, a ball stem 325 including upper and lower portions respectively coupled with the handle 324 and the ball 321, which are provided to the supply line shut-off valve 32, where the ball stem 325 transmits a torque of the handle 324 to the ball 321 during the rotation of the handle 324 to rotate the ball 321, and a stem grand 326 that is integrally coupled with the body 323 and accommodates the ball stem 325 therein.

In an embodiment, as shown in FIGS. 4 and 5, the first supply unit side heating unit 33 may include a line side heating unit 331 that heats the molten potassium nitrate supply line 31 and a valve side heating unit 332 that heats the supply line shut-off valve 32, and the line side heating unit 331 may use or include a crucible heater.

In an embodiment, as shown in FIG. 5, the valve side heating unit 332 may include a valve body side heating unit 3321 that heats an outer circumferential surface of the body 323 of the supply line shut-off valve 32. The valve side heating unit 332 may further include an insulator 3322

In an embodiment, as shown in FIG. 5, the insulator 3322 may be installed on the stem grand 326 of the supply line shut-off valve 32 to conserve heat.

In an alternative embodiment, the supply unit 3 may include a molten potassium nitrate supply line 31 that supplies the molten potassium nitrate filled in the refill furnace 2 to the tempering furnace 1, a molten potassium nitrate supply pump SP (shown in FIGS. 8A and 8B) installed at the molten potassium supply line 31 to supply the molten potassium nitrate filled in the refill furnace 2 to the tempering furnace 1 via the molten potassium supply line 31 by pressure action, a second supply unit side heating unit that heats the molten potassium nitrate supply line 31 and the molten potassium nitrate supply pump SP such that the molten potassium nitrate may not be hardened while passing through the molten potassium nitrate supply line 31 and the molten potassium nitrate supply pump SP, and a pump control unit M (shown in FIGS. 8A and 8B) that controls the molten potassium nitrate supply pump SP in response to the control signal from the central control unit 6 to control an amount of the molten potassium nitrate supplied to the tempering furnace 1 from the refill furnace 2.

In such an embodiment, the molten potassium nitrate supply pump SP may be used instead of the supply line shut-off valve 32. The second supply unit side heating unit may correspond to the first supply unit side heating unit 33 shown in FIGS. 4 and 5. The first supply unit side heating unit 33 may be used as the second supply unit side heating unit to heat the molten potassium nitrate supply line 31 and the molten potassium nitrate supply pump SP.

The tempering furnace side load measuring unit 4 or the refill furnace side load measuring unit 5 may use or include a weight measuring unit W that measures a weight of the tempering furnace 1 or the refill furnace 2 or may use a water level detection unit that measures a water level of the molten potassium nitrate in the tempering furnace 1 or the refill furnace 2 to measure the load amount of the potassium nitrate filled in the tempering furnace 1 or the refill furnace 2.

Figure 6:
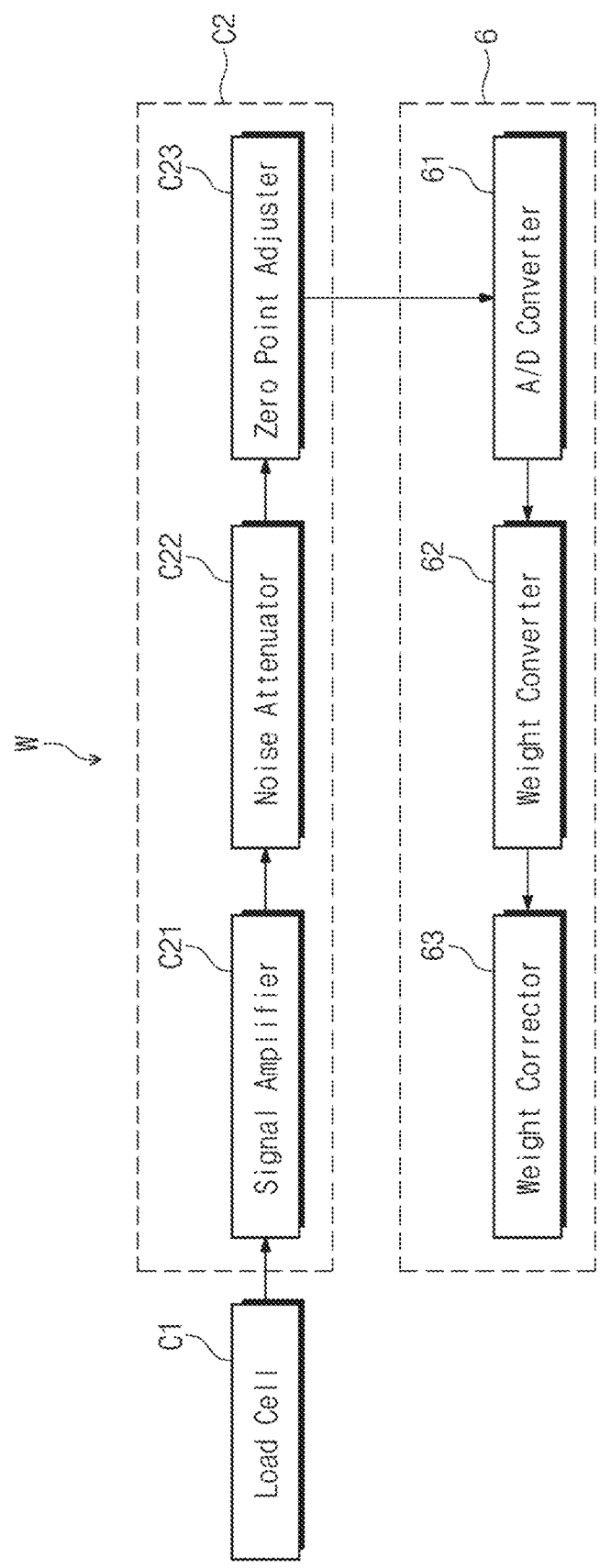
FIG. 6 is a block diagram showing components of a weight measuring unit when the weight measuring unit is used as a tempering furnace side load measuring unit and a refill furnace side loading measuring unit according to an embodiment of the disclosure.

In an embodiment where the weight measuring unit W is used as the tempering furnace side load measuring unit 4 or the refill furnace side load measuring unit 5, as shown in FIG. 6, the weight measuring unit may include a load cell C1 that is installed at a lower portion of each of the tempering furnace 1 and the refill furnace 2 and outputs a voltage signal proportional to or inversely proportional to the weight of the tempering furnace 1 or the refill furnace 2 and a signal processing unit C2 that amplifies a fine voltage signal output from the load cell C1, attenuates a noise signal included in the amplified signal, and adjusts a direct current offset voltage level of the output signal whose noise signal is attenuated.

In an embodiment, as shown in FIG. 6, the central control unit 6 may include an A/D converter 61 that converts an analog voltage output from the signal processing unit C2 to digital data, a weight converter 62 that converts the digital data output from the analog-to-digital ("A/D") converter 61 to the weight of the tempering furnace 1 or the refill furnace 2, and a weight corrector 63 that calculates a difference between an actual weight of the tempering furnace 1 or the refill furnace 2, which is measured by a precision measuring instrument, and the weight of the tempering furnace 1 or the refill furnace 2, which is converted by the weight converter 62, and adds or subtracts the weight difference to or from the weight of the tempering furnace 1 or the refill furnace 2, which is converted by the weight converter 62, to correct the weight of the tempering furnace 1 or the refill furnace 2.

In an embodiment, as shown in FIG. 6, the signal processing unit C2 may include a signal amplifier C21 that amplifies the fine voltage output from the load cell C1, a noise attenuator C22 that attenuates a noise component output from the signal amplifier C21, and a zero point adjuster C23 that adjusts the direct current offset voltage level of a voltage signal output from the noise attenuator C22.

In an embodiment, the central control unit 6 may refill the molten potassium nitrate of about 87% to about 93% with respect to a total potassium nitrate load capacity of the tempering furnace 1 when refilling the molten potassium nitrate into the tempering furnace 1 where all molten potassium nitrate is drained out.

In such an embodiment, when the potassium nitrate of about 87% to about 93% with respect to the total potassium nitrate load capacity of the tempering furnace 1 is refilled into the tempering furnace 1, the refill furnace 2 may be filled with the powdered potassium nitrate, and the load amount of the powdered potassium nitrate may be determined to allow an amount of the molten potassium nitrate obtained when the powdered potassium nitrate is melted to the liquid state to be within a range of about 87% to about 93% with respect to a total potassium nitrate load capacity of the refill furnace 2.

In such an embodiment, during a glass tempering process using the tempering furnace 1, in a case where the load amount of the molten potassium nitrate filled in the tempering furnace 1 is reduced by about 5% to about 25% from the load amount of the molten potassium nitrate filled in the tempering furnace 1 when the glass is first immersed, the central control unit 6 may refill the molten potassium nitrate filled in the refill furnace 2 to the tempering furnace 1 to allow the load amount of the molten potassium nitrate in the tempering furnace to be within a range of about 87% to about 93% with respect to the total molten potassium nitrate load capacity in the tempering furnace.

In an embodiment, as shown in FIG. 3, the refill system may further include a timer counter TC to measure time, and when the tempering furnace 1 is filled with the molten potassium nitrate corresponding to about 87% to about 93% of the total potassium nitrate load capacity of the tempering furnace 1, the central control unit 6 may allow a glass-loaded cassette to be immersed in the molten potassium nitrate after waiting a predetermined time using the timer counter TC.

Figure 7A:
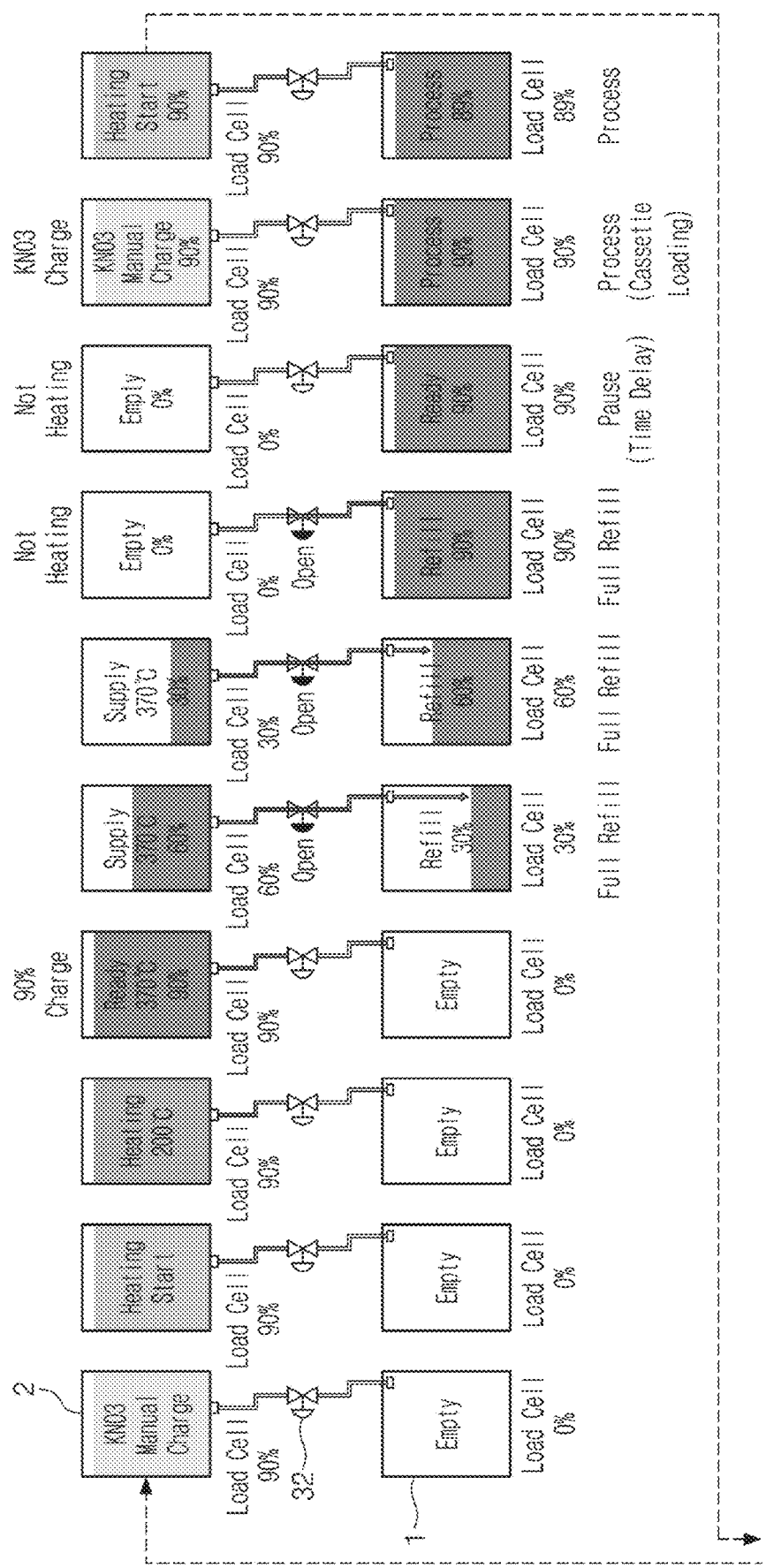
FIGS. 7A and 7B are views showing an operation of a first embodiment of the disclosure.
Figure 7B:
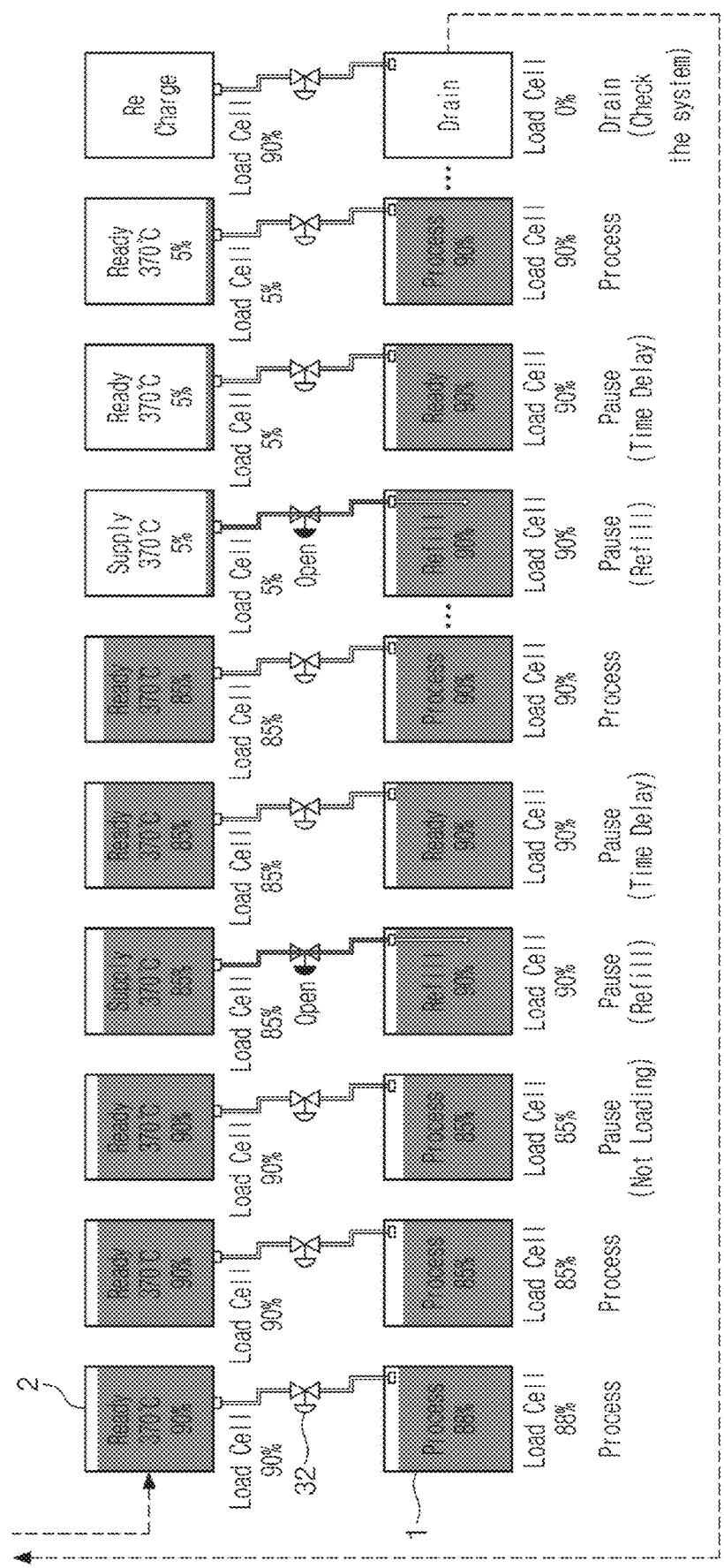

An operation of an embodiment of the disclosure where the supply line shut-off valve 32 is installed at the molten potassium nitrate supply line 31 will hereinafter be described in detail with reference to FIGS. 7A and 7B.

In such an embodiment, the powdered potassium nitrate may be filled in the refill furnace 2 to refill the molten potassium nitrate to the tempering furnace 1, and the load amount of the powdered potassium nitrate may be determined to allow the amount of the molten potassium nitrate obtained when the powdered potassium nitrate is melted to the liquid state to become about 90% of the total potassium nitrate load capacity of the refill furnace 2.

Then, the central control unit 6 may allow the refill furnace 2 to be heated at a temperature of about 370 Celsius degrees or more to melt the powdered potassium nitrate, which is filled in the refill furnace 2, to the molten potassium nitrate.

After that, the central control unit 6 may open the supply line shut-off valve 32 to supply the molten potassium nitrate filled in the refill furnace 2 to the tempering furnace 1. The central control unit 6 may close the supply line shut-off valve 32 when the tempering furnace 1 is filled with the molten potassium nitrate of about 90% or more of the total potassium nitrate load amount.

In an embodiment, when the molten potassium nitrate in the refill furnace 2 is completely drained, the central control unit 6 no longer heats the refill furnace 2.

Then, the central control unit 6 may wait for a predetermined time to stabilize the molten potassium nitrate filled in the tempering furnace 1 before immersing the glass-loaded cassette in the tempering furnace 1, and an operator that performs the glass tempering process may fill the refill furnace 2 with the powdered potassium nitrate. In an embodiment, the load amount of the powdered potassium nitrate may be determined to allow the amount of the molten potassium nitrate to become about 90% of the total potassium nitrate load capacity of the refill furnace 2 when the powdered potassium nitrate is melted to the liquid state.

Next, the glass-loaded cassette may be immersed in the molten potassium nitrate of the tempering furnace 1, and the central control unit 6 may heat the refill furnace 2 to convert the powdered potassium nitrate to the molten potassium nitrate.

After that, the refill furnace 2 may be heated at a temperature of about 370 Celsius degrees or more such that the molten potassium nitrate filled in the refill furnace 2 may not be hardened.

In an embodiment, when the molten potassium nitrate in the tempering furnace 1 is reduced from about 90% to about 85% of the total potassium nitrate load capacity in the tempering furnace 1 due to a chemical reaction between the molten potassium nitrate in tempering furnace 1 and the glass, the central control unit 6 may temporarily stop the tempering process for the glass and may open the supply line shut-off valve 32 to refill the molten potassium nitrate to the tempering furnace 1 such that the molten potassium nitrate in the tempering furnace 1 may become about 90% of the total potassium nitrate load capacity of the tempering furnace 1.

In an embodiment, when the molten potassium nitrate filled in the tempering furnace 1 becomes about 90% of the total potassium nitrate load capacity of the tempering furnace 1, the central control unit 6 may wait for the predetermined time to stabilize the molten potassium nitrate filled in the tempering furnace 1.

Then, the central control unit 6 may start and continue the tempering process for the glass after waiting for the predetermined time and may repeatedly perform the process of refilling the molten potassium nitrate filled in the refill furnace 2 to the tempering furnace 1 and the process of stabilizing the molten potassium nitrate filled in the tempering furnace 1 whenever the molten potassium nitrate in the tempering furnace 1 is reduced from about 90% to about 85% of the total potassium nitrate load capacity of the tempering furnace 1.

In an embodiment, when the tempering process is completed and the molten potassium nitrate filled in the tempering furnace 1 and the refill furnace 2 is completely drained from the tempering furnace 1 and the refill furnace 2, the operator may check all of the refill system for the tempering of the glass whether there is any abnormal state, and in a case where there is no abnormal state found, the tempering process returns to an initial process of supplying the powdered potassium nitrate to the refill furnace 2.

Figure 8A:
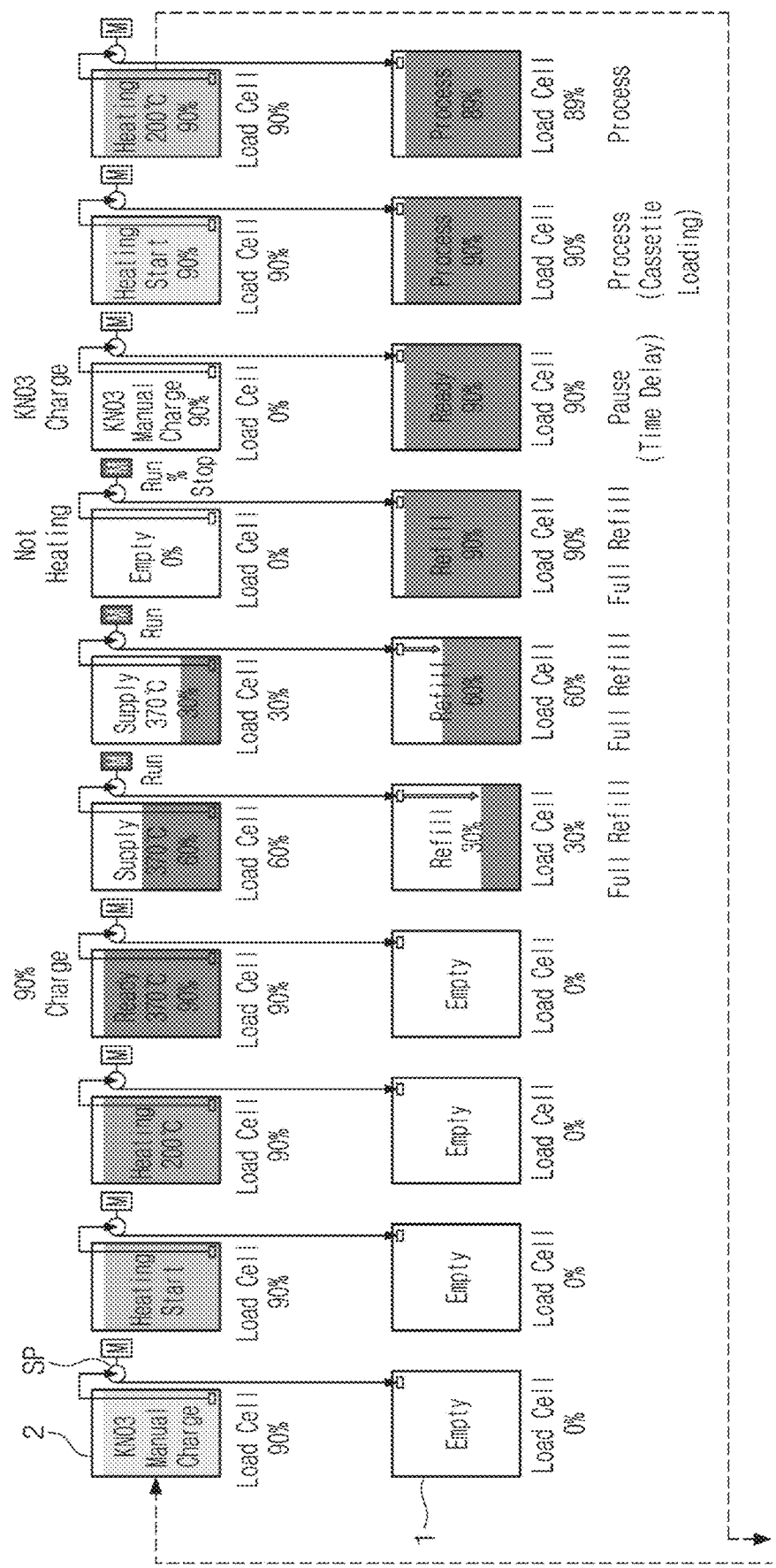
FIGS. 8A and 8B are views showing an operation of a second embodiment of the disclosure.
Figure 8B:
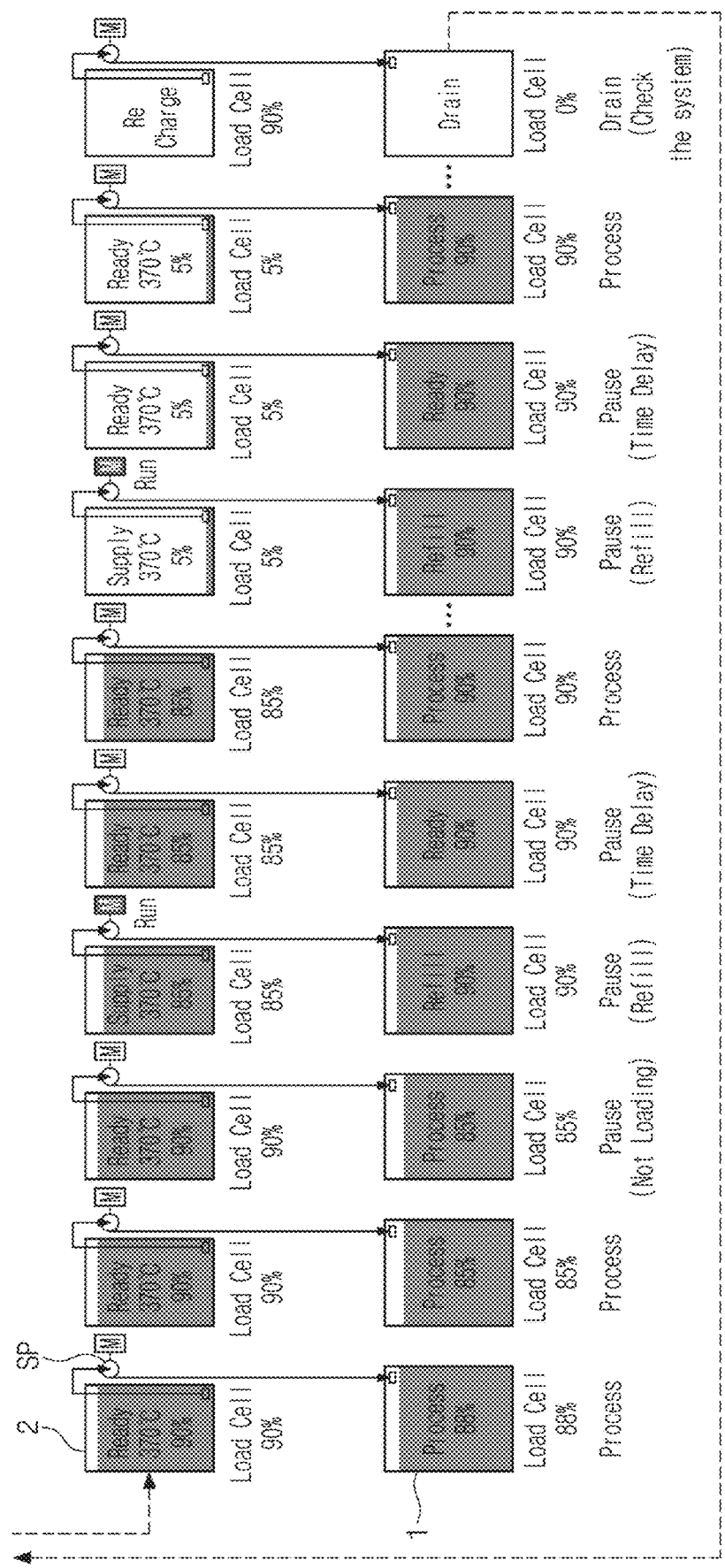

Hereinafter, an operation of an alternative embodiment of the disclosure where the molten potassium nitrate supply pump SP is installed at the molten potassium nitrate supply line 31 will be described in detail with reference to FIGS. 8And 8B.

First, the powdered potassium nitrate may be filled in the refill furnace 2 to refill the molten potassium nitrate to the tempering furnace 1, and the load amount of the powdered potassium nitrate may be determined to allow the amount of the molten potassium nitrate obtained when the powdered potassium nitrate is melted to the liquid state to become about 90% of the total potassium nitrate load capacity of the refill furnace 2.

Then, the central control unit 6 may heat the refill furnace 2 at a temperature of about 370 Celsius degrees or more to melt the powdered potassium nitrate, which is filled in the refill furnace 2, to the molten potassium nitrate.

After that, the central control unit 6 may operate the molten potassium nitrate supply pump SP to supply the molten potassium nitrate filled in the refill furnace 2 to the tempering furnace 1. The central control unit 6 may stop operating the molten potassium nitrate supply pump SP when the tempering furnace 1 is filled with the molten potassium nitrate of about 90% or more of the total potassium nitrate load amount In such an embodiment, when the molten potassium nitrate in the refill furnace 2 is completely drained, the central control unit 6 no longer heats the refill furnace 2.

Then, the central control unit 6 may wait for a predetermined time to stabilize the molten potassium nitrate filled in the tempering furnace 1 before immersing the glass-loaded cassette in the tempering furnace 1, and the operator may fill the refill furnace 2 with the powdered potassium nitrate. In such an embodiment, the load amount of the powdered potassium nitrate may be determined to allow the amount of the molten potassium nitrate to become about 90% of the total potassium nitrate load capacity of the refill furnace 2 when the powdered potassium nitrate is melted to the liquid state.

Next, the glass-loaded cassette may be immersed in the molten potassium nitrate of the tempering furnace 1, and the refill furnace 2 may be heated to convert the powdered potassium nitrate to the molten potassium nitrate.

After that, the refill furnace 2 may be heated at a temperature of about 370 Celsius degrees or more such that the molten potassium nitrate filled in the refill furnace 2 may not be hardened.

In an embodiment, when the molten potassium nitrate in the tempering furnace 1 is reduced from about 90% to about 85% of the total potassium nitrate load capacity in the tempering furnace 1 due to a chemical reaction between the molten potassium nitrate in tempering furnace 1 and the glass, the central control unit 6 may temporarily stop the tempering process for the glass and may operate the molten potassium nitrate supply pump SP to refill the molten potassium nitrate to the tempering furnace 1 such that the molten potassium nitrate in the tempering furnace 1 may become about 90% of the total potassium nitrate load capacity of the tempering furnace 1.

In an embodiment, when the molten potassium nitrate filled in the tempering furnace 1 becomes about 90% of the total potassium nitrate load capacity of the tempering furnace 1, the central control unit 6 may wait for the predetermined time to stabilize the molten potassium nitrate filled in the tempering furnace 1.

Then, the central control unit 6 may start and continue the tempering process for the glass after waiting for the predetermined time and may repeatedly perform the process of refilling the molten potassium nitrate filled in the refill furnace 2 to the tempering furnace 1 and the process of stabilizing the molten potassium nitrate filled in the tempering furnace 1 whenever the molten potassium nitrate in the tempering furnace 1 is reduced from about 90% to about 85% of the total potassium nitrate load capacity of the tempering furnace 1.

In an embodiment, when the tempering process is completed and the molten potassium nitrate filled in the tempering furnace 1 and the refill furnace 2 is completely drained from the tempering furnace 1 and the refill furnace 2, the operator may check all of the refill system for the tempering of the glass whether there is any abnormal state, and in a case where there is no abnormal state found, the tempering process returns to an initial process of supplying the powdered potassium nitrate to the refill furnace 2.

According to embodiments of the disclosure, the refill system with improved utilization rate of the UTG production process may automatically refill the molten potassium nitrate to the tempering furnace 1 from the refill furnace 2 and may automatically refill the molten potassium nitrate filled in the refill furnace 2 to the tempering furnace 1 when the load amount of the molten potassium nitrate filled in the tempering furnace 1 does not meet the set reference value.

Accordingly, embodiments of the refill system with improved utilization rate of the UTG production process according to the disclosure may automatically refill a chemical solution based on an amount of the chemical solution for the glass tempering process, which is filled in the tempering furnace 1, and thus, a filling time and a replacing time for the chemical solution in the tempering furnace 1 may decrease, thereby increasing a productivity of tempered glass.

In such embodiments of the disclosure, when refilling the chemical solution in the tempering furnace 1, a liquid chemical solution may be directly refilled instead of a chemical powder. Accordingly, a downtime of the refill system for the tempering of the glass may be reduced, and defects on the glass due to contamination occurring when the chemical powder is injected into the tempering furnace 1 may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A refill system of an ultra-thin glass production process, the refill system comprising:
   a tempering furnace filled with a molten potassium nitrate to temper a glass;
   a refill furnace which receives a powdered potassium nitrate to melt the powdered potassium nitrate to the molten potassium nitrate and stores the molten potassium nitrate obtained by melting the powdered potassium nitrate;
   a supply unit which supplies the molten potassium nitrate in the refill furnace to the tempering furnace;
   a tempering furnace side load measuring unit which measures a load amount of the molten potassium nitrate in the tempering furnace;
   a refill furnace side load measuring unit which measures a load amount of the molten potassium nitrate in the refill furnace; and
   a central control unit which checks the load amount of the molten potassium nitrate in the tempering furnace and the load amount of the molten potassium nitrate in the refill furnace in real time using the tempering furnace side load measuring unit and the refill furnace side load measuring unit, controls the supply unit to supply the molten potassium nitrate in the refill furnace to the tempering furnace, and controls the supply unit to stop supplying the molten potassium nitrate to the tempering furnace when the load amount of the molten potassium nitrate in the tempering furnace is greater than or equal to a predetermined load amount, wherein the central control unit pauses for a predetermined time to stabilize the molten potassium nitrate filled in the tempering furnace before immersing any glass-loaded cassette in the tempering furnace when the supply unit is controlled to stop supplying the molten potassium nitrate to the tempering furnace.

2. The refill system of claim 1, wherein the central control unit allows the molten potassium nitrate of 87% to 93% with respect to a total potassium nitrate load capacity of the tempering furnace to be refilled in the tempering furnace when refilling the molten potassium nitrate into the tempering furnace where all molten potassium nitrate in the tempering furnace is drained out.

3. The refill system of claim 1, wherein, when the potassium nitrate of 87% to 93% with respect to a total potassium nitrate load capacity of the tempering furnace is refilled into the tempering furnace, the refill furnace is filled with the powdered potassium nitrate, and a load amount of the powdered potassium nitrate is determined to allow an amount of the molten potassium nitrate obtained when the powdered potassium nitrate is melted to a liquid state to be within a range of 87% to 93% of a total potassium nitrate load capacity of the refill furnace.

4. The refill system of claim 1, wherein, in a case where the load amount of the molten potassium nitrate in the tempering furnace during a glass tempering process using the tempering furnace is reduced by 5% to 25% from the load amount of the molten potassium nitrate in the tempering furnace when the glass is first immersed, the central control unit refills the molten potassium nitrate in the refill furnace to the tempering furnace to allow the load amount of the molten potassium nitrate in the tempering furnace to be within a range of 87% to 93% with respect to a total potassium nitrate load capacity of the tempering furnace.

5. The refill system of claim 1, further comprising:
a timer counter which measures the predetermined time, wherein the central control unit allows a glass-loaded cassette to be immersed in the molten potassium nitrate after waiting the predetermined time using the timer counter when the tempering furnace is filled with the molten potassium nitrate corresponding to 87% to 93% of a total potassium nitrate load capacity of the tempering furnace.

6. The refill system of claim 1, wherein the refill furnace comprises:
an outer case;
a potassium nitrate storage tank installed in the outer case, wherein the potassium nitrate storage tank stores the powdered potassium nitrate or the molten potassium nitrate;
a potassium nitrate melting unit disposed between the outer case and the potassium nitrate storage tank, wherein the potassium nitrate melting unit heats the potassium nitrate storage tank to change phase from the powdered potassium nitrate in the potassium nitrate storage tank to the molten potassium nitrate; and
a refill furnace side temperature measuring unit which measures a temperature of the molten potassium nitrate in the potassium nitrate storage tank in real time.

7. The refill system of claim 6, wherein the potassium nitrate melting unit comprises:
a side heater installed in the outer case and disposed between an inner sidewall of the outer case and an outer sidewall of the potassium nitrate storage tank to heat a side portion of the potassium nitrate storage tank;
a bottom heater installed in the outer case and disposed between an inner bottom of the outer case and an outer bottom of the potassium nitrate storage tank to heat a lower portion of the potassium nitrate storage tank; and
a refill furnace side heater control unit which controls the side heater and the bottom heater to allow the temperature of the molten potassium nitrate, which is measured by the refill furnace side temperature measuring unit, to be within a set temperature range.

8. The refill system of claim 6, wherein
a potassium nitrate melting unit entrance is defined through one side surface of the outer case to move the potassium nitrate melting unit into and out of the outer case, and
the refill furnace further comprises a transfer unit which withdraws the potassium nitrate melting unit out of the outer case through the potassium nitrate melting unit entrance by sliding the potassium nitrate melting unit or inserts the potassium nitrate melting unit from outside the outer case into the outer case by sliding the potassium nitrate melting unit.

9. The refill system of claim 1, wherein the refill furnace is installed at a position higher than a position where the tempering furnace is installed to allow the molten potassium nitrate in the refill furnace to be introduced into the tempering furnace through the supply unit.

10. The refill system of claim 9, wherein the supply unit comprises:
a molten potassium nitrate supply line which supplies the molten potassium nitrate in the refill furnace to the tempering furnace;
a supply line shut-off valve installed at the molten potassium nitrate supply line, wherein the supply line shut-off valve opens or closes the molten potassium nitrate supply line to stop or to continue a flow of the molten potassium nitrate to the tempering furnace, and controls a flow rate of the molten potassium nitrate supplied to the tempering furnace from the refill furnace based on a valve opening degree thereof;
a first supply unit side heating unit which heats the molten potassium nitrate supply line and the supply line shut-off valve such that the molten potassium nitrate passing through the molten potassium nitrate supply line and the supply line shut-off valve is not hardened; and
an opening degree control unit which opens and closes the supply line shut-off valve or adjusts the valve opening degree of the supply line shut-off valve in response to a control signal from the central control unit.

11. The refill system of claim 10, wherein the opening degree control unit comprises:
a linear actuator which linearly moves a moving rod in response to the control signal from the central control unit; and
a valve handle rotation unit which rotates a handle mounted on the supply line shut-off valve in conjunction with the moving rod when the moving rod moves linearly.

12. The refill system of claim 10,
wherein the supply line shut-off valve comprises:
a body connected to the molten potassium nitrate supply line to pass the molten potassium nitrate therethrough;
a ball installed in the body to adjust the flow rate of the molten potassium nitrate;
a connector equipped for pipe connection on left and right ends of the body;
a ball stem comprising upper and lower portions respectively coupled with a handle mounted on the supply line shut-off valve and the ball, wherein the ball stem transmits a torque of the handle to the ball during a rotation of the handle to rotate the ball; and a stem grand integrally coupled with the body, wherein the stem grand accommodates the ball stem therein, wherein the first supply unit side heating unit comprises:

a line side heating unit which heats the molten potassium nitrate supply line; and a valve side heating unit which heats the supply line shut-off valve, wherein the valve side heating unit comprises a valve body side heating unit which heats an outer circumferential surface of the body of the supply line shut-off valve, and the stem grand of the supply line shut-off valve comprises an insulator to conserve a heat.

13. The refill system of claim 1, wherein the supply unit comprises:

a molten potassium nitrate supply line which supplies the molten potassium nitrate in the refill furnace to the tempering furnace;

a molten potassium nitrate supply pump installed at the molten potassium supply line to supply the molten potassium nitrate in the refill furnace to the tempering furnace via the molten potassium supply line by pressure action;

a second supply unit side heating unit which heats the molten potassium nitrate supply line and the molten potassium nitrate supply pump such that the molten potassium nitrate is not hardened while passing through the molten potassium nitrate supply line and the molten potassium nitrate supply pump; and a pump control unit which controls the molten potassium nitrate supply pump in response to a control signal from the central control unit to control an amount of the molten potassium nitrate supplied to the tempering furnace from the refill furnace.

14. The refill system of claim 1, wherein the tempering furnace side load measuring unit includes at least one selected from a weight measuring unit which measures a weight of the tempering furnace and a water level detection unit which measures a water level of the molten potassium nitrate in the tempering furnace to measure the load amount of the potassium nitrate in the tempering furnace, and the refill furnace side load measuring unit includes at least one selected from a weight measuring unit which measures a weight of the refill furnace and a water level detection unit which measures a water level of the molten potassium nitrate in the refill furnace to measure the load amount of the potassium nitrate in the refill furnace.

* * * * *